United States Patent
Chen

(10) Patent No.: US 10,198,573 B2
(45) Date of Patent: Feb. 5, 2019

(54) METHOD, DEVICE AND COMPUTER STORAGE MEDIUM FOR CONTROLLING THE RUNNING OF AN APPLICATION

(71) Applicant: Tencent Technology (Shenzhen) Company Limited, Shenzhen, Guangdong (CN)

(72) Inventor: Shuhua Chen, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 230 days.

(21) Appl. No.: 14/688,812

(22) Filed: Apr. 16, 2015

(65) Prior Publication Data

US 2015/0220730 A1 Aug. 6, 2015

Related U.S. Application Data

(63) Continuation of application No. PCT/CN2013/090819, filed on Dec. 30, 2013.

(30) Foreign Application Priority Data

Jun. 13, 2013 (CN) .......................... 2013 1 0233604

(51) Int. Cl.
*G06F 21/00* (2013.01)
*G06F 21/53* (2013.01)
(Continued)

(52) U.S. Cl.
CPC ............ *G06F 21/53* (2013.01); *G06F 21/566* (2013.01); *G06F 9/445* (2013.01); *G06F 2221/033* (2013.01)

(58) Field of Classification Search
CPC ............................... G06F 21/53; G06F 21/566
See application file for complete search history.

(56) References Cited

U.S. PATENT DOCUMENTS 5,974,549 A * 10/1999 Golan .................... G06F 9/468
714/47.3
6,973,577 B1 * 12/2005 Kouznetsov .......... G06F 21/566
707/999.009

(Continued)

FOREIGN PATENT DOCUMENTS

CN 101311903 A 11/2008
CN 101425016 A 5/2009

(Continued)

OTHER PUBLICATIONS

International Search Report for PCT/CN2013/090819 dated Apr. 3, 2014; and Written Opinion of the International Searching Authority, 10 pages.

*Primary Examiner* — Christopher C Harris
(74) *Attorney, Agent, or Firm* — Tim Tingkang Xia, Esq.; Locke Lord LLP

(57) ABSTRACT

A method for controlling the running of an application includes loading an application to be monitored; running the application loaded herein in a constructed running environment; and, according to a preset running configuration, executing a corresponding operation in the running environment, and processing a system call triggered by the application according to the operation herein. Furthermore, a device for controlling the running of an application includes a loading module configured to load an application to be monitored; a running module configured to run the application loaded herein in a constructed running environment; and a controlling module configured to execute a corresponding operation in the running environment according to a preset running configuration, and process a system call triggered by the application according to the operation herein. The present disclosure can thus ensure that data and applications are controlled and improve security.

20 Claims, 6 Drawing Sheets

(51) Int. Cl.
*G06F 21/56* (2013.01)
*G06F 9/445* (2018.01)

(56) References Cited

U.S. PATENT DOCUMENTS

| | | | | |
|---|---|---|---|---|
| 7,971,255 | B1* | 6/2011 | Kc | G06F 21/566 713/164 |
| 8,806,647 | B1* | 8/2014 | Daswani | H04L 63/1425 713/161 |
| 8,887,152 | B1* | 11/2014 | Chen | G06F 9/44568 717/174 |
| 2002/0056076 | A1* | 5/2002 | Made | G06F 21/563 717/129 |
| 2005/0076237 | A1* | 4/2005 | Cohen | G06F 9/468 726/4 |
| 2005/0108562 | A1* | 5/2005 | Khazan | G06F 11/3604 726/23 |
| 2005/0268338 | A1* | 12/2005 | Made | G06F 21/562 726/24 |
| 2006/0021029 | A1 | 1/2006 | Brickell et al. | |
| 2009/0158260 | A1* | 6/2009 | Moon | G06F 21/53 717/133 |
| 2012/0287039 | A1* | 11/2012 | Brown | G06F 3/0488 345/156 |
| 2012/0304310 | A1* | 11/2012 | Blaisdell | G06F 21/52 726/28 |
| 2013/0097706 | A1* | 4/2013 | Titonis | G06F 21/56 726/24 |
| 2015/0264074 | A1* | 9/2015 | Mendelev | G06F 11/3672 726/25 |
| 2015/0278513 | A1* | 10/2015 | Krasin | G06F 9/5005 726/30 |

FOREIGN PATENT DOCUMENTS

| | | |
|---|---|---|
| CN | 102184356 A | 9/2011 |
| CN | 102929650 A | 2/2013 |
| WO | 2013/050600 A1 | 4/2013 |

* cited by examiner

METHOD, DEVICE AND COMPUTER STORAGE MEDIUM FOR CONTROLLING THE RUNNING OF AN APPLICATION

CROSS-REFERENCE TO RELATED APPLICATIONS

This application is a continuation application of PCT Patent Application No. PCT/CN2013/090819, entitled "METHOD, DEVICE AND COMPUTER STORAGE MEDIUM FOR CONTROLLING THE RUNNING OF AN APPLICATION", filed on Dec. 30, 2013, which claims priority to Chinese Patent Application No. 201310233604.6, entitled "METHOD AND DEVICE FOR CONTROLLING THE RUNNING OF AN APPLICATION", filed on Jun. 13, 2013, which is hereby incorporated by reference in its entirety.

TECHNICAL FIELD

The present disclosure relates to the field of security protection technology, and more particularly to a method, a device and a computer storage medium for controlling the running of an application.

BACKGROUND

Along with the introduction of high performance and high configuration mobile devices, various applications, operated on mobile devices, present an unprecedented boom. Rapidly developing applications add more functions to mobiles devices, but also have brought increasing risks to mobile devices, which are running more and more applications.

In mobiles devices, the conventional security protection technology simply scans applications to see whether there are viruses in said applications, such as an APP virus, but for the reason of the system authority, it is difficult to ensure the running of data or applications in said mobile devices can be controlled.

To ensure that the running of said data or applications is controlled, said mobile device needs to own a super administrator authority, so as to monitor said data or operations. However, a tedious firmware flash process is needed in order to own the super administrator authority, which will seriously damage the security of said mobile device itself, and once a certain virus acquires said super administer authority, said firmware flash process herein will cause a disastrous result, which seriously affects the security of said mobile device.

BRIEF SUMMARY

In view of the defects existing in the conventional method mentioned above that the data and operations triggered by applications are difficult to be monitored so that the control and security of the data or applications can't be ensured, in one aspect, the present disclosure provides a method for controlling a running of an application in a computing device, which can ensure that data and the application are controlled so as to increase security.

In at least one aspect, a method for controlling the running of an application in a computing device includes:
 loading an application to be monitored;
 running said application loaded herein in a constructed running environment; and
 according to a preset running configuration, executing a corresponding operation in said running environment, and processing a system call triggered by said application according to said operation herein.

In another aspect, the present disclosure provides a device for controlling the running of an application, which can ensure that data and the application are controlled, so as to increase security.

In at least one aspect, a device for controlling the running of an application includes:
 a loading module, configured to load an application to be monitored;
 a running module, configured to run said application loaded herein in a constructed running environment; and
 a controlling module, configured to execute a corresponding operation in said running environment, and, according to a preset running configuration, process a system call triggered by said application according to said operation herein.

In another aspect, the present disclosure provides a computer readable storage medium, including computer executable instructions, wherein said computer executable instructions cause a computing device to control the running of an application, including:
 loading an application to be monitored;
 running said application loaded herein in a constructed running environment; and
 according to a preset running configuration, executing a corresponding operation in said running environment, and processing a system call triggered by said application according to said operation herein.

According to the method, device, and computer readable storage medium for controlling the running of an application of the present disclosure, an application to be monitored is loaded, and said application loaded herein is run in a constructed running environment; according to a preset running configuration, a corresponding operation is executed in said running environment, and according to said operation herein, a system call, triggered by the running application, is processed, thereby operations can be added according to said preset running configuration during the running of the application. Accordingly, compared with the prior art, various operations, with respect to data and applications, can be added according to the running configuration, so as to execute the data management and behavior monitoring of applications, and since the applications are running in a constructed running environment, the normal running of the operating system will not be affected even if the running application has problems. Thereby, data and applications in said mobile device are controlled, the security is improved, and the device has better scalability.

DETAILED DESCRIPTION

In order to make the purpose, technical solutions, and advantages of the present disclosure to be understood more clearly, the present disclosure will be described in further details with the accompanying drawings and the following embodiments. It should be understood that the specific embodiments described herein are merely examples to illustrate the disclosure, not to limit the present disclosure.

Figure 1:
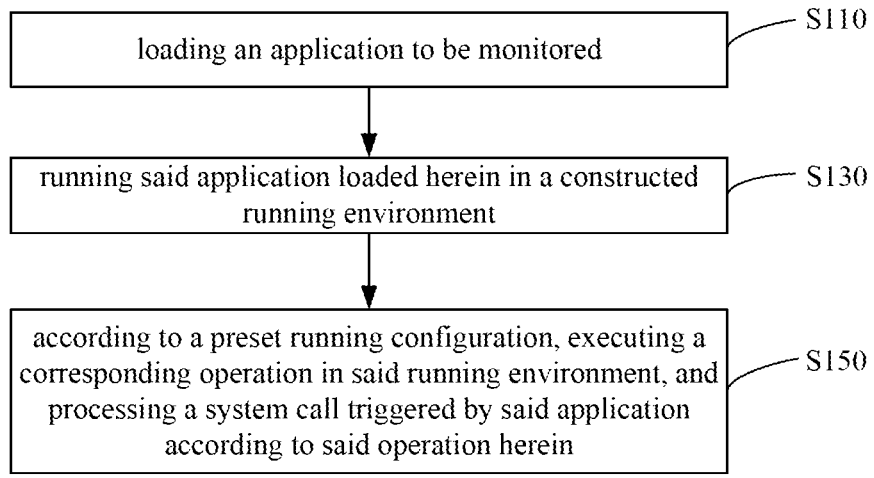
FIG. 1 is a flow diagram illustrating a method for controlling the running of an application according to an embodiment of the present disclosure.

In an embodiment as shown in FIG. 1, a method for controlling the running of an application includes the following steps:

S110: loading an application to be monitored.

In this embodiment, said application is installed in a mobile device. The application to be monitored is an application that is about to be scanned for security or to be triggered for running in a mobile terminal.

S130: running said application loaded herein in a constructed running environment.

In this embodiment, said constructed running environment is an intermediate layer between the application and the operating system. Specifically, the constructed running environment is a security sandbox, which is a limited security environment constructed in said operating system. As a result, the application, running in said running environment herein, will not affect or even damage the operating system. Specifically, said operating system is one of many available operating systems such as Android, iOS, Linux, Windows, or Symbian, and so on.

Since the application is triggered and run in such an independent space of said constructed running environment, if running errors or other problems occur in the process of running, said application can be terminated and cleared. Thereby, the stable running of the operating system is guaranteed and the security is improved.

In the process of running the application, operations triggered by the application are recorded so as to monitor the behavior of the application, and to further ensure the security of the running of the application.

Since the constructed running environment is independent of said operating system, if suspicious operations or other over-range operations occur during the running of the application, in the running of the application, said running environment is capable of prohibiting said suspicious operations or other over-range operations.

The running environment is further capable of generating prompt information indicating that said application is a suspicious application, thereby security detection of the application is achieved and the security of said operating system is ensured.

S150: according to a preset running configuration, executing a corresponding operation in said running environment, and processing a system call triggered by said application according to said operation herein.

In this embodiment, said running configuration has configuration information set with respect to data associated with the running of the application or behaviors of the application. Thereby, in the case that the application needs to trigger a system call in the process of running, data associated with the running of the application or behaviors of the application are effectively controlled according to the running configuration. Said data and application are controlled by way of triggering a certain operation so as to process said system call triggered by said application according to said operation herein.

Preferably, the operation executed herein may be an operation of encrypting or clearing or switching of data, and so on, or may be a re-set operation triggered for a mobile device, or may be an operation of disabling a certain function of the application. The operation executed herein is determined according to data management or application management involved with the running configuration, which need not be specifically defined herein.

A system call will be necessarily triggered when the application is running in said constructed running environment, and said system call is associated with the running configuration. Only after the corresponding operation has been executed according to the preset running configuration, the system call triggered by the application is processed according to said operation.

In the method for controlling the running of an application mentioned above, the operation needed is executed according to the preset running configuration before the application triggers the system call, and then the system call is executed. The operation to be executed can be set according to the requirements of data management and application management, so as to ensure that data and the running of the application are controlled, and the scalability is improved.

Figure 2:
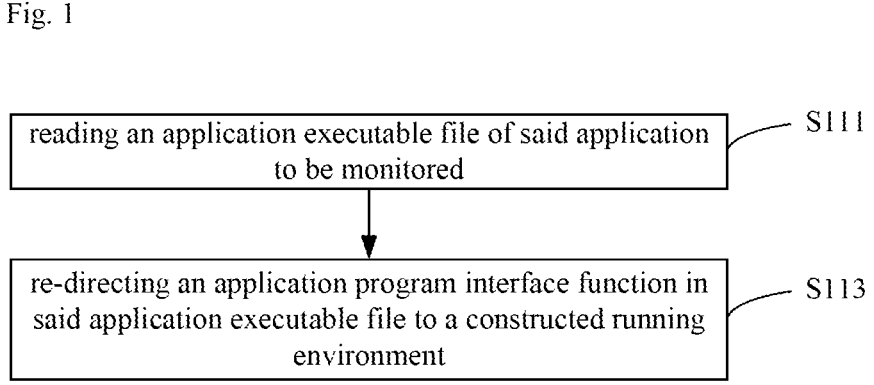
FIG. 2 is a flow diagram illustrating a step of loading an application to be monitored in the method as shown in FIG. 1.

In an embodiment as shown in FIG. 2, said step S110 includes:

S111: reading an application executable file of said application to be monitored.

In this embodiment, the application executable file is an executing program of the application. For example, in the Android operating system, the application executable file is a file with "dex" as a suffix, i.e., an executing program of Android Dalvik.

When executing an application, said running environment will read the application executable file of said application, so as to execute said application executable file.

S113: re-directing an application programming interface function in said application executable file to a constructed running environment.

In this embodiment, the application executable file is pre-processed to control all the system calls, which are triggered during the running of the application, to be re-directed to the constructed running environment, so as to ensure that all behaviors in the process of the running of the application are controlled.

The application programming interface function in the application executable file, configured to achieve the communication between the application and the operating system, is an interface for notifying the operating system of the task to be executed. In the process of loading the application executable file, the application programming interface function in the application executable file is modified, so that the constructed running environment will execute the task that originally would be executed by the operating system. The process herein is transparent and makes no difference to the running application, and will not affect the normal stable running of the application. However, said process herein enables the system call triggered in the application to be controlled, so as to ensure the security of the system call.

Furthermore, the modification of the application executable file is, in substance, a process of adding behavior monitoring points into the application executable file. Particularly, the running configuration is acquired, and the system call to be monitored can be acquired according to said running configuration, so as to redirect the corresponding application programming interface function to the constructed running environment.

Figure 3:
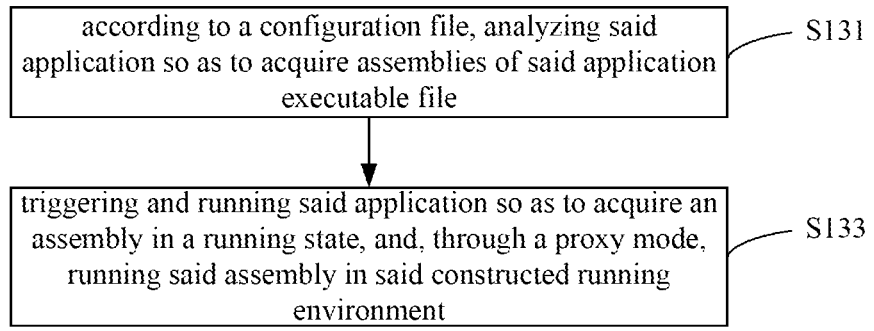
FIG. 3 is a flow diagram illustrating a step of running said application loaded herein in a constructed running environment in the method as shown in FIG. 1.

In an embodiment as shown in FIG. 3, said step S130 includes:

S131: according to a configuration file, analyzing said application so as to acquire assemblies of said application executable file.

In this embodiment, the file package corresponding to said application includes a configuration file and an application executable file. Said configuration file records information such as the registered assembly name, and so on. Said application in a running state is analyzed through a Java reflection mechanism, so as to acquire several assemblies contained in the application executable file, and the assembly proxies corresponding to said assemblies.

Furthermore, the constructed running environment provides following assembly proxies corresponding to four types of assemblies: Activity proxy, Service proxy, Broad Cast Receiver proxy, and Content Provider proxy. Each of the assembly proxies corresponds to the same type of assembly, for example, Activity proxy relates to Activity assembly.

According to the registered assemblies in the configuration file, the application executable file is analyzed, so as to acquire the assemblies in the application executable file.

S133: triggering and running said application so as to acquire an assembly in a running state, and, through a proxy mode, running said assembly in said constructed running environment.

In this embodiment, along with the running of the application, the assembly is triggered to run. At this moment, the assembly acquired is in a running state, so as to achieve running of said assembly through the corresponding assembly proxy in the constructed running environment.

Furthermore, the assembly proxy extracts the class name from the configuration file, corresponding to the assembly in the running state, instantiates said class through the reflection correlation function, and calls a corresponding fixed entry function, wherein the reflection correlation function is a function correlated to a Java reflection mechanism. Said fixed entry function is an entry point for running of the application. For example, an onCreat function should be called to start the application. Therefore, said reflection correlation function may be Class.forName, method.invoke, and so on, while said fixed entry function may be onCreate, onStart, onRestart, onResume, onStopon, Destroy, and so on.

Figure 4:
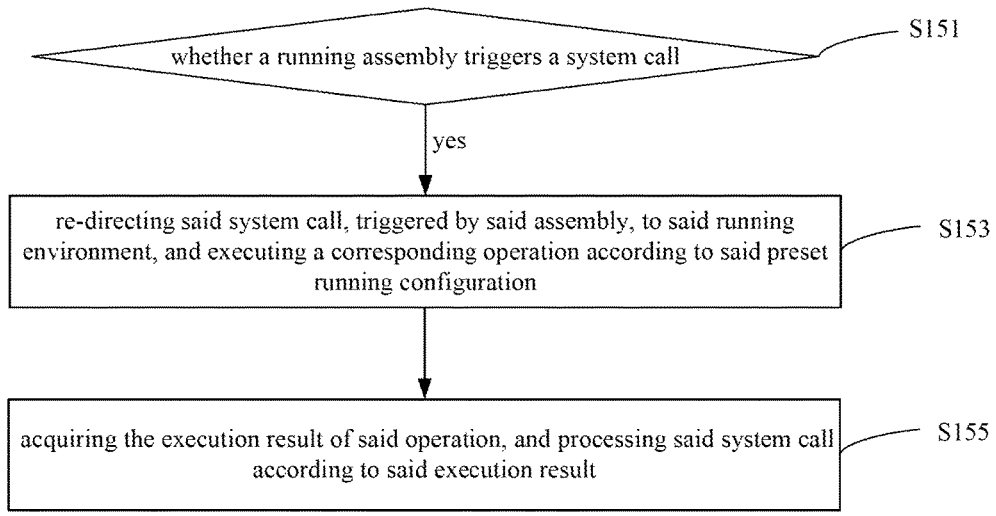
FIG. 4 is a flow diagram illustrating a step of executing a corresponding operation in said running environment according to a preset running configuration, and processing a system call triggered by said application according to said operation herein in the method as shown in FIG. 1.

In an embodiment as shown in FIG. 4, said step S150 includes:

S151: judging whether a running assembly triggers a system call, and if it does, then proceeding to step S153, and if not, then not processing.

In this embodiment, during the running of the application, it is judged whether a running assembly triggers a system call, and if it does, then said system call triggered herein is redirected to said running environment, so as to make the system call triggered herein also be controlled. Thereby, the self-security of the system is guaranteed.

S153: re-directing said system call, triggered by said assembly, to said running environment, and executing a corresponding operation according to said preset running configuration.

In this embodiment, the preset running configuration is acquired, after the system call triggered by the assembly is redirected to the running environment. It is acknowledged according to the preset running configuration that said system call was recorded in the configuration information. At this moment, only after the corresponding operation has been executed according to said running configuration, the system call is achieved. Where the running configuration is acquired through a controlling interface set herein, said running configuration may be a configuration distributed by a server, or may be a configuration set by a local user.

For example, the system call triggered herein may be a write operation call for data. When the write operation call for data is triggered, said preset running configuration will be read, that is the configuration information that the data to be written need to be encrypted is extracted from the running configuration. At this moment, an encryption operation will be executed to the data to be written. After the encryption operation is executed, according to the execution result that the encryption operation has been completed, the write operation of the system file will be called to write in the encrypted data.

S155: acquiring an execution result of said operation, and processing said system call according to said execution result.

In this embodiment, according to the execution result of said operation, it can be acknowledged whether said operation has been executed, and if it has, then said system call triggered herein will be processed.

Figure 5:
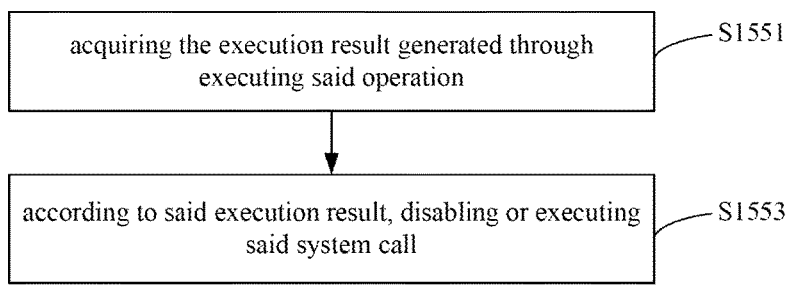
FIG. 5 is a flow diagram illustrating a step of acquiring an execution result of said operation, and processing said system call according to said execution result in the step as shown in FIG. 4.

In an embodiment as shown in FIG. 5, said step S155 includes:

S1551: acquiring an execution result generated through executing said operation.

S1553: according to said execution result, disabling or executing said system call.

In this embodiment, after acknowledging through the execution result that the operation has been successfully completed, the system call triggered herein will be disabled or executed. For example, the system call triggered herein calls a photographing function for the application, the operation of disabling the photographing function is to be executed according to the preset running configuration. At this moment, after the execution of disabling the photographing function has been completed, the system call triggered herein will be disabled, so that the application management in the mobile device is achieved, and the mobile device cannot photograph.

Figure 6:
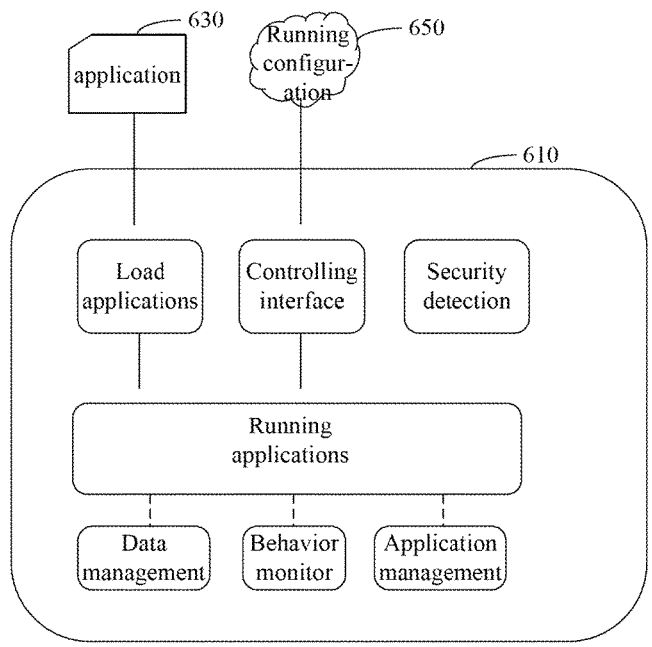
FIG. 6 is a block diagram illustrating an implementation of the method for controlling the running of an application according to an embodiment of the present disclosure.

The method for controlling the running of an application mentioned above will be described in further details with a specific embodiment. In the embodiment as shown in FIG. 6, said method for controlling the running of an application creates a program 610 for controlling the running of an application. When said program 610 starts or runs a certain application 630, said program 610 will monitor the security of application 630.

Said program 610 for controlling the running of an application loads said application 630, and runs it in a constructed running environment. The program 610 reads, through a control interface, the running configuration 650 set by a server or set by a local user, so that, according to said running configuration, said program 610 executes, in said running environment herein, a data management operation, such as encrypting or clearing or switching, of the data created during the running of said application 630, or executes an application management operation such as resetting or disabling some functions of the application, so as to process the system call triggered in the application according to the execution result of the operation.

Figure 7:
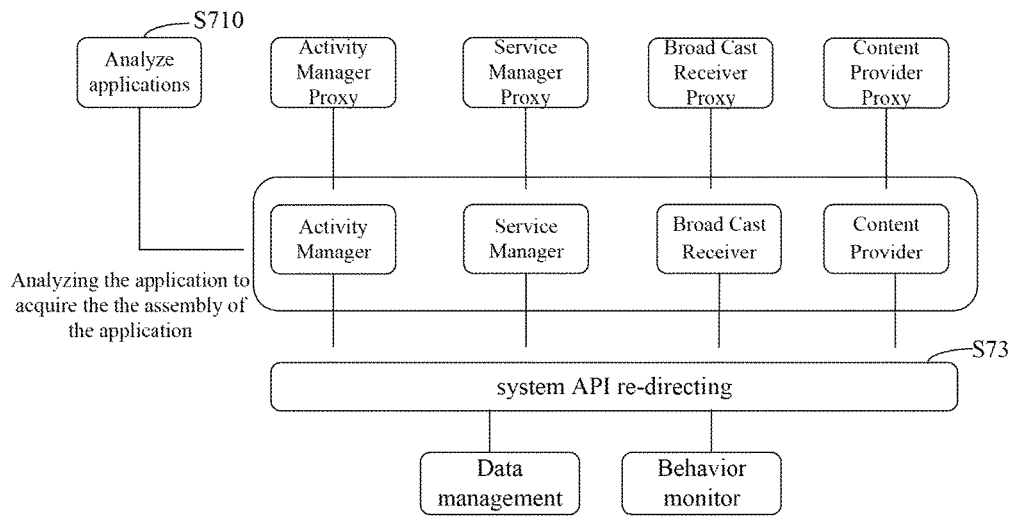
FIG. 7 is a block diagram illustrating a step of running said application in a constructed running environment in the implementation as shown in FIG. 6.

Furthermore, as shown in FIG. 7, during the process of loading an application, said application is analyzed according to step S710, so as to decompose said application to acquire the assemblies in the application. Functions of the assemblies are achieved through the proxy mode in the running environment via Activity proxies provided herein, such as Activity Manager Proxy, Service Manager Proxy, Broad Cast Receiver Proxy, or Content Provider Proxy, so as to achieve running of the application in the running environment.

When the running application triggers a system call, the system call is redirected to the running environment according to step S730, so as to execute a data management operation, an application management operation, or behavior monitoring, according to said running configuration.

Furthermore, a security detection will be executed on the application in the constructed running environment, so as to ensure the security of the operating system.

Figure 8:
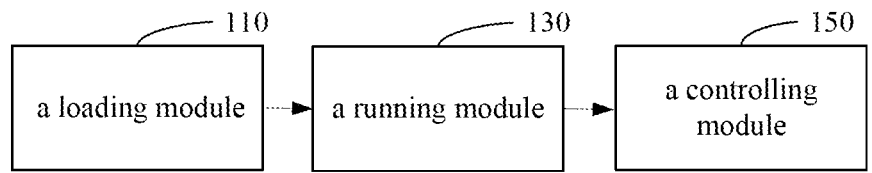
FIG. 8 is a structure diagram illustrating a device for controlling the running of an application according to an embodiment of the present disclosure.

In an embodiment as shown in FIG. 8, a device for controlling the running of an application includes a loading module 110, a running module 130, and a controlling module 150.

The loading module 110 is configured to load an application to be monitored.

In this embodiment, said application is installed in a mobile device. The application to be monitored is an application that is about to be scanned for security or to be triggered for running in a mobile terminal.

The running module 130 is configured to run said application loaded herein in a constructed running environment.

In this embodiment, said constructed running environment is an intermediate layer between the application and the operating system. Specifically, the constructed running environment is a security sandbox, which is a limited security environment constructed in said operating system. As a result, the application, running in said running environment herein, will not affect or even damage the operating system. Specifically, said operating system is one of many available operating systems such as Android, iOS, Linux, Windows, or Symbian, and so on.

The running module 130 triggers and runs the application in an independent space of said constructed running environment, and if running errors or other problems occur in the process of running, said application can be terminated and cleared. Thereby the stable running of the operating system is guaranteed and the security is improved.

In the process of running the application, said running module 130 records operations triggered by the application so as to monitor the behavior of the application, and to further ensure the security of the running of the application.

Since the constructed running environment is independent of said operating system, if suspicious operations or other over-range operations occur during the running of the application, said running module 130, via said running environment, is capable of prohibiting said suspicious operations or other over-range operations, and generating prompt information indicating that said application is a suspicious application. Thereby, security detection of the application is achieved, and the security of said operating system is ensured.

The controlling module 150 is configured to execute a corresponding operation in said running environment according to a preset running configuration, and process a system call triggered by said application according to said operation herein.

In this embodiment, said running configuration has configuration information set with respect to data associated with the running of the application or behaviors of the application. Thereby, in the case that the application needs to trigger a system call during the running of the application, data associated with the running of the application or behaviors of the application are effectively controlled according to the running configuration. The controlling module 150 controls said data and application by way of triggering a certain operation so as to process said system call triggered by said application according to said operation herein.

Preferably, the operation executed by the controlling module 150 may be an operation of encrypting or clearing or switching of data, and so on, or may be a re-set operation triggered for a mobile device, or may be an operation of disabling a certain function of the application. The operation executed herein is determined according to data management or application management involved with the running configuration, which need not be specifically defined herein.

A system call will be triggered when the application is running in said constructed running environment, and said system call is associated with the running configuration. Only after the controlling module 150 has executed the corresponding operation according to the preset running configuration, the system call triggered by the application is processed according to said operation.

In the device for controlling the running of an application mentioned above, the needed operation is executed according to the preset running configuration before the application triggers the system call, and then the system call is executed. The operation to be executed can be set according to the requirements of data management and application management, so as to ensure that data and the running of the application are controlled, and the scalability is improved.

Figure 9:
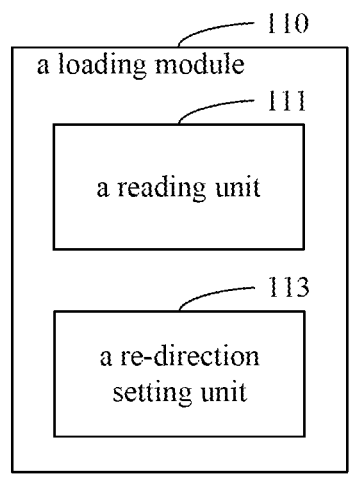
FIG. 9 is a structure diagram illustrating the loading module in the device as shown in FIG. 8.

In an embodiment as shown in FIG. 9, said loading module 110 includes a reading unit 111 and a re-direction setting unit 113.

The reading unit 111 is configured to read an application executable file of said application to be monitored.

In this embodiment, the application executable file is an executing program of the application. For example, in the Android operating system, the application executable file is a file with "dex" as a suffix, i.e., an executing program of Android Dalvik.

When the constructed running environment executes an application, said reading unit 111 will read the application executable file of said application, so as to execute said application executable file.

The re-direction setting unit 113 is configured to re-direct the application programming interface function in said application executable file to said constructed running environment.

In this embodiment, said re-direction setting unit 113 pre-processes the application executable file to control all the system calls, which are triggered during the running of the application, to be re-directed to the constructed running environment, so as to ensure all behaviors during the running of the application are controlled.

The application programming interface function in the application executable file, configured to achieve the communication between the application and the operating system, is an interface for notifying the operating system of the task to be executed. In the process of loading the application executable file, said re-direction setting unit 113 modifies the application programming interface function in the application executable file so that the constructed running environment will execute the tasks which were originally executed by the operating system. The process herein is transparent and makes no difference to the running application, and will not affect the normal stable running of the application. However, said process herein enables the system call triggered in the application to be controlled, so as to ensure the security of the system call.

Furthermore, the modification of the application executable file is, in substance, a process of adding behavior monitoring points into the application executable file. Particularly, said re-direction setting unit 113 acquires the running configuration, and the system call to be monitored can be acquired according to said running configuration, so as to redirect the corresponding application programming interface function to the constructed running environment.

Figure 10:
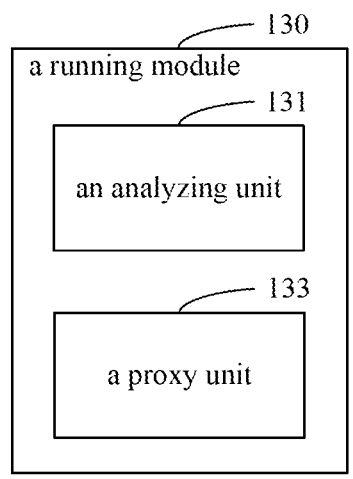
FIG. 10 is a structure diagram illustrating the running module in the device as shown in FIG. 8.

In an embodiment as shown in FIG. 10, said running module 130 includes an analyzing unit 131 and a proxy unit 133.

An analyzing unit 131 is configured to analyze said application according to a configuration file so as to acquire assemblies of said application executable file.

In this embodiment, the file package corresponding to said application includes a configuration file and an application executable file. Said configuration file records information such as the registered assembly name, and so on, and said analyzing unit 131 analyzes said application in a running state through a Java reflection mechanism so as to acquire several assemblies contained in the application executable file. The assembly proxies correspond to said assemblies.

Furthermore, the constructed running environment provides the following assembly proxies corresponding to four types of assemblies: Activity proxy, Service proxy, Broad Cast Receiver proxy and Content Provider proxy. Each of the assembly proxies corresponds to the same type of assembly, for example, the Activity proxy relates to the Activity assembly.

According to the registered assemblies in the configuration file, said analyzing unit 131 analyzes the application executable file so as to acquire the assemblies in the application executable file.

A proxy unit 133 is configured to trigger and run said application so as to acquire an assembly in a running state, and, through a proxy mode, run said assembly in said constructed running environment.

In this embodiment, along with the running of the application, the assembly is triggered to run. At this time, said proxy unit 133 acquires the assembly in a running state so as to achieve running of said assembly through the corresponding assembly proxy in the constructed running environment.

Furthermore, through the assembly proxy, said proxy unit 133 extracts the class name, from the configuration file, corresponding to the assembly in a running state, instantiates said class through the reflection correlation function, and calls a corresponding fixed entry function, wherein the reflection correlation function is a function correlated to Java reflection mechanism, and said fixed entry function is an entry point for running of the application. For example, an onCreat function should be called to start the application. Therefore, said reflection correlation function may be Class.forName, method.invoke, and so on, and said fixed entry function may be onCreate, onStart, onRestart, onResume, onStopon, Destroy, and so on.

Figure 11:
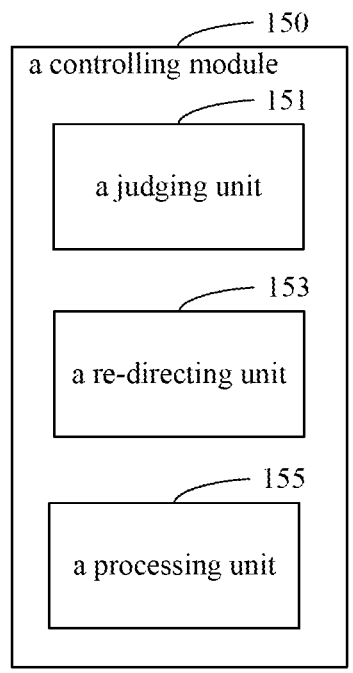
FIG. 11 is a structure diagram illustrating the controlling module in the device as shown in FIG. 8.

In an embodiment as shown in FIG. 11, said controlling module 150 includes a judging unit 151, a re-directing unit 153, and a processing unit 155.

The judging unit 151 is configured to judge whether a running assembly triggers a system call, and if it does, then notify the re-directing unit 153, otherwise if not, then not process.

In this embodiment, during the running of the application, said judging unit 151 judges whether a running assembly triggers a system call, and if it does, then notifies the re-directing unit 153 to re-direct said triggered system call to said running environment so as to make the triggered system call also be controlled. Thereby, the self-security of the system is guaranteed.

The re-directing unit 153 is configured to re-direct said system call, triggered by said assembly, to said running environment, and execute a corresponding operation according to said preset running configuration.

In this embodiment, said re-directing unit 153 acquires the preset running configuration. After the system call triggered by the assembly is redirected to the running environment, it is acknowledged according to the preset running configuration that said system call was recorded in the configuration information. At this time, only after the corresponding operation has been executed according to said running configuration, the system call is achieved. Wherein the running configuration is acquired through a controlling interface set herein, said running configuration may be a configuration distributed by a server, or may be a configuration set by a local user.

For example, the system call triggered herein may be a write operation call for data. When the write operation call for data is triggered, said re-directing unit 153 will read said preset running configuration. The configuration information, that the data to be written needs to be encrypted, is extracted from the running configuration. At this time, an encryption operation will be executed for the data to be written. After the encryption operation is executed, according to the execution result that the encryption operation has been completed, the write operation of the system file will be called to write in the encrypted data.

The processing unit 155 is configured to acquire an execution result of said operation, and process said system call according to said execution result.

In this embodiment, according to the execution result of said operation, said processing unit 155 acknowledges whether said operation has been executed. If it has, then said triggered system call will be processed.

Figure 12:
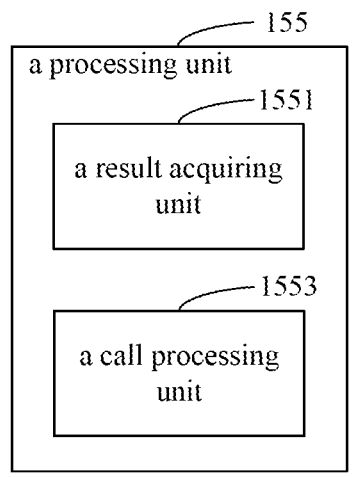
FIG. 12 is a structure diagram illustrating the processing unit in the module as shown in FIG. 11.

In an embodiment as shown in FIG. 12, said processing unit 155 includes a result acquiring unit 1551 and a call processing unit 1553.

The result acquiring unit 1551 is configured to acquire an execution result generated through executing said operation.

The call processing unit 1553 is configured to disable or execute said system call according to said execution result.

In this embodiment, after acknowledging through the execution result that the operation has been successfully completed, the call processing unit 1553 will disable or execute the system call triggered herein. For example, the system call triggered herein calls a photographing function for the application, and the operation of disabling the photographing function is to be executed according to the preset running configuration. At this time, after the execution of disabling the photographing function has been completed, the system call triggered herein will be disabled, so that the application management in the mobile device is achieved, and the mobile device cannot photograph.

The method and device for controlling the running of an application mentioned above provide, through a constructed running environment, a controlled security environment for running the application. This achieves effective management of data and applications. Especially in situations where the mobile device accesses enterprise data (such as emails or enterprise files) through an application, the security of the enterprise data herein will be protected.

The ordinary technician in the field can understand that, all of or part of the processes implementing the methods in the embodiments mentioned above may be achieved by means of relevant hardware commanded by computer programs. The computer programs may be stored in a computer readable storage medium, and they may include the processes of embodiments of the respective methods mentioned above when the program is executed. The storage medium may be a disk or CD or read-only memory or random access memory, etc.

Figure 13:
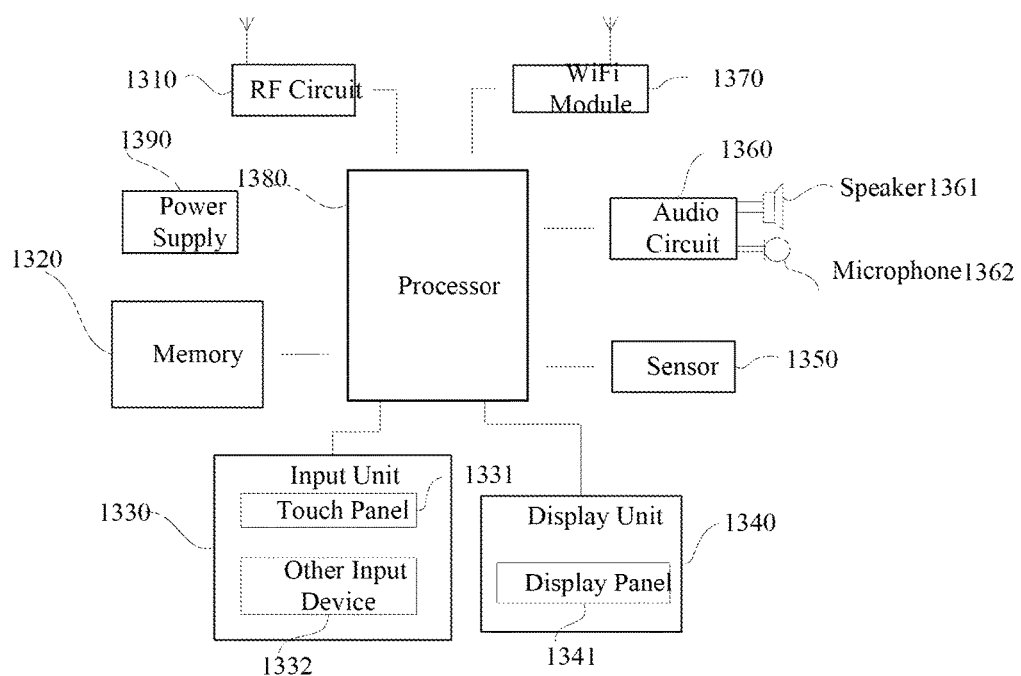
FIG. 13 is a block diagram illustrating partial structure of a mobile phone associated with terminals provided in embodiments of the present disclosure.

In an embodiment as shown in FIG. 13, another device for controlling the running of an application is further provided. In order to more conveniently illustrate this embodiment of the present disclosure, FIG. 13 shows only the part of said device relevant to this embodiment. For other technical details that are not illustrated in FIG. 13, reference is made to other embodiments herein involving methods of the present disclosure. Said device may be based on any terminal device such as a mobile phone, tablet PC, PDA (personal digital assistant), POS (point of sales) equipment, on-board computer, and so on. A mobile phone or a mobile terminal will be taken as an example.

FIG. 13 is a block diagram illustrating a partial structure of a mobile phone 1300 associated with terminals provided in embodiments of the present disclosure. As shown in FIG. 13, the mobile phone includes an RF (Radio Frequency, RF) circuit 1310, a memory 1320, an input unit 1330, a display unit 1340, a sensor 1350, an audio circuit 1360, a wireless fidelity (wireless fidelity, Wi-Fi) module 1370, a processor 1380, a power supply 1390, and so on. It should be understood by those skilled in the art that, the mobile phone is not limited by the structure of the mobile phone shown in FIG. 13, but may include more or fewer components, or any combinations thereof, or the components may be arranged in different layouts.

Various components of the mobile phone in this example will be described in more detail with reference to FIG. 13.

The RF circuit 1310 is used to send and receive signals in process of sending and receiving messages or making phone calls, preferably, after receiving downlink information from a base station. The RF circuit 1310 sends said downlink information to the processor 1380 for processing. On the other hand, the designed uplink data is sent to the base station. Usually, the RF circuit 1310 includes but is not limited to, an antenna circuitry, at least one amplifier, a transceiver, a coupler, a low noise amplifier (LNA), a duplexer, and so on. Moreover, the RF circuit 1310 may also communicate with other devices through wireless communication and/or network communication. The wireless communication mentioned above may use any communication or protocol that includes, but is not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, SMS (Short Messaging Service), and so on.

The memory 1320 is configured to store software programs and modules. The processor 1380 executes various functions of the mobile phone and data processing applications by running said software programs and modules saved in the memory 1320. The memory 1320 may include a program storage area and a data storage area, wherein said program storage area may store an operating system program, application program required by at least one function (such as sound playback, image playback, etc.), and so on. Said data storage area may store data created according to usage of the mobile phone (such as audio data, phone book, etc.). In addition, said memory 1320 may include a high-speed random access memory, and may further include a non-volatile memory, such as at least one of disk storage devices, flash memory devices and other volatile solid state memory devices.

Said input unit 1330 is configured to receive numbers or character information entered by the user, and for generating key signal inputs relevant to user settings and function control of the mobile phone 1300. Particularly, said input unit 1330 may include a touch panel 1331 and other input devices 1332. Said touch panel 1331, also known as a touch screen, is configured to collect the user's touch operations thereon or nearby (for example, a user operates on or near said touch panel 1331 using a finger, a stylus, and/or any other suitable objects or attachments), and drive corresponding connecting devices based on a preset program. Preferably, said touch panel 1331 may include a touch detection unit and a touch controller. The touch detection unit detects the touch position of the user, and detects signals generated by the touch operation, and then the signals are sent to a touch controller. The touch controller receives the touch information from said touch detection unit and converts said touch information into contact coordinates, and then sends said contact coordinates to said processor 1380. Said touch controller is also able to receive instructions from said processer 1380 and execute said instructions. Said touch panel 1331 may be realized in various configurations, such as resistance-type, capacitance-type, infrared-ray, and surface acoustic wave configurations. In addition to said touch panel 1331, said input unit 1330 may further include another input device 1332. Particularly, said other input device 1332 includes, but is not limited to, one or more of a physical keyboard, function keys (such as volume control buttons, switch buttons, etc.), a trackball, a mouse, and an operating lever.

Said display unit 1340 is configured to display the information entered by a user or information provided to a user as well as various menus of the mobile phone. Said display unit 1340 may include a display panel 1341. Particularly, said display panel 1341 may be configured as a LCD (Liquid Crystal Display) panel, an OLED (Organic Light-Emitting Diode) panel, or other forms of display panel. Preferably, said touch panel 1331 covers said display panel 1341.

After detecting a touch operation thereon or nearby, said touch panel 1331 generates a touch signal and sends said touch signal to said processor 1380 so as to determine the type of touch event. In response, said processor 1380 provides a corresponding visual output on said display panel 1341 according to the type of touch event. Although in the embodiment shown in FIG. 13, said touch panel 1331 and said display panel 1341 are embodied as two separate components to achieve input and output functions of the mobile phone, in some embodiments, said touch panel 1331 and said display panel 1341 may be integrated to achieve input and output functions of the mobile phone.

The mobile phone 1300 may further include at least one sensor 1350, such as an optical sensor, motion sensor, and other types of sensors. Particularly, the optical sensor may include an ambient light sensor and a proximity sensor, wherein the ambient light sensor can adjust the brightness of the display panel 1341 according to the brightness of ambient light, and the proximity sensor can close said display panel 1341 and/or backlight when the mobile phone moves to the ear. As a motion sensor, an accelerometer sensor can detect the value of acceleration in each direction (typically three axis), and can detect the magnitude and direction of gravity when it is in static state. Further, an accelerometer can be used for applications that involve identifying the phone posture (such as horizontal and vertical screen switching, related games, magnetometer calibration posture), vibration recognition related functions (e.g., pedometer, percussion), etc. As for other sensors that may be equipped in the mobile phone, such as a gyroscope, barometer, hygrometer, thermometer, infrared sensor and so on, which will not be described here in detail.

Said audio circuit 1360, speaker 1361, and microphone 1362 can provide an audio interface between the user and the mobile phone. Said audio circuit 1360 can receive audio data and convert the audio data into electrical signals, and then transmit said electrical signals to said speaker 1361. Said speaker 1361 converts said electrical signals to audio signals to be output. On the other hand, said microphone 1362 converts collected sound signals to electrical signals. After receiving said electrical signals, the audio circuit 1360 converts said electrical signals to audio data, and outputs said audio data to the processor 1380 for processing. Said audio data are then sent to another phone via said RF circuit 1310, or are sent to said memory 1320 for further processing.

Wi-Fi belongs to a short-range wireless transmission technology. A mobile phone can help a user to send and receive email, browse the web, access streaming media, and so on via the Wi-Fi module 1370 which provides wireless broadband Internet access to the user. Although FIG. 13 shows a Wi-Fi module 1370, it should be understood that the Wi-Fi module is not an essential part of said mobile phone 1300, and may be omitted as needed within the scope of the present disclosure.

Said processor 1380 is the control center of the mobile phone, and is configured to connect each part of the mobile phone through a variety of interfaces and connections. Said processor 1320 executes various functions of the mobile phone and data processing to monitor the overall operation of the mobile phone, by running or executing software programs and/or modules stored in the memory 1320 and calling in data stored in the memory 1320. Preferably, said processor 1380 may include one or more processing units. Preferably, an application processor and a modem processor may be integrated in said processor 1380. Said application processor processes the operating system, user interface, and applications, and said modem processor deals with wireless communications. It should be understood that said modem processor mentioned above may or may not be integrated into said processor 1380.

Said mobile phone 1300 further includes a power supply 1390 (such as a battery), configured to supply power to various parts. Preferably, said power supply system is logically connected to said processor 1380 via a power management system, thereby realizing functions such as charging management, discharging management, power consumption management, and so on via the power management system.

Although not shown, said mobile phone 1300 may further include a camera, Bluetooth module, etc., which are not discussed in detail here.

In an embodiment of present disclosure, the processor 1380 also has the following features, wherein the processor 1380 is operational for:

loading an application to be monitored;

running said application loaded herein in a constructed running environment; and according to a preset running configuration, executing a corresponding operation in said running environment, and processing a system call triggered by said application according to said operation herein.

Furthermore, said operation of loading an application to be monitored includes:

reading an application executable file of said application to be monitored; and re-directing an application programming interface function in said application executable file to said constructed running environment.

Furthermore, said operation of running said application loaded herein in a constructed running environment includes:

according to a configuration file, analyzing said application so as to acquire assemblies of said application executable file; and triggering and running said application so as to acquire an assembly in a running state, and, through a proxy mode, running said assembly in said constructed running environment.

Furthermore, said operation of, according to a preset running configuration, executing a corresponding operation in said running environment, and processing a system call triggered by said application according to said operation herein includes:

judging whether a running assembly triggers a system call, and if it does, then re-directing said system call, triggered by said assembly, to said running environment, and executing a corresponding operation according to said preset running configuration; and acquiring an execution result of said operation, and processing said system call according to said execution result.

Furthermore, said operation of acquiring an execution result of said operation, and processing said system call according to said execution result includes:

acquiring the execution result generated through executing said operation; and according to said execution result, disabling or executing said system call.

The foregoing examples are preferred embodiments of the present disclosure only and are not intended to limit the present disclosure. It should be understood that, to the person skilled in the art, various modifications and improvements can be made without departing from the spirit and principle of the present disclosure, which should all be included within the scope of the present disclosure. Therefore, the scope of protection of the present disclosure shall be defined by the appended claims.

What is claimed is:

1. A method for controlling a running of an application in a computing device, the method comprising:
   loading an application to be monitored;
   according to a configuration file, analyzing said application and acquiring assemblies of an application executable file;
   triggering and running said application and acquiring an assembly in a running state, and, through a proxy mode, running said assembly in said constructed running environment;
   judging that a running assembly triggers a system call;
   redirecting said system call, triggered by said running assembly, to said constructed running environment, and executing a corresponding operation according to a preset running configuration;
   acquiring an execution result of said corresponding operation, wherein the corresponding operation comprises an operation of encrypting data, a reset operation triggered for the computing device, and an operation of disabling a certain function of said application; and then processing said system call according to said execution result of said corresponding operation when said execution result of the corresponding operation indicates that the corresponding operation has been successfully completed, after the corresponding operation has been executed according to said preset running configuration;
   wherein said preset running configuration is acquired through a control interface set on a processor, said preset running configuration is a configuration distributed by a server, or is a configuration set by a local user.

2. The method for controlling the running of an application according to claim 1, wherein said step of loading an application to be monitored comprises: reading said application executable file of said application to be monitored; and redirecting an application programming interface function in said application executable file to said constructed running environment.

3. The method for controlling the running of an application according to claim 1, wherein said step of acquiring an execution result of said corresponding operation, and then processing said system call according to said execution result of said operation comprises: acquiring the execution result of said corresponding operation generated through executing said corresponding operation; and according to said execution result of said corresponding operation, disabling or executing said system call.

4. The method for controlling the running of an application according to claim 1, wherein said constructed running environment is a security sandbox.

5. The method for controlling the running of an application according to claim 1, wherein said constructed running environment is an intermediate layer between said application and an operating system, and wherein said operating system is at least one of a set of operating systems comprising Android, iOS, Linux, Windows, and Symbian.

6. The method for controlling the running of an application according to claim 1, wherein said preset running configuration includes configuration information set with respect to data associated with the running of the application or behaviors of the application, so that said data associated with the running of the application or behaviors of the application are effectively controlled according to the preset running configuration.

7. The method for controlling the running of an application according to claim 1, after the step of redirecting said system call, triggered by said running assembly, to said constructed running environment, the method further comprises: when said system call is recorded in configuration information according to the preset running configuration, processing said system call triggered by said application according to said execution result of said corresponding operation herein when said execution result of the corresponding operation indicates that the corresponding operation has been successfully completed.

8. A device for controlling a running of an application, said device comprising a processor and a memory, the memory configured to store software programs and modules, the processor running said software programs and modules saved in the memory,
   wherein the processor is configured to:
   load an application to be monitored;
   analyze said application according to a configuration file and acquire assemblies of an application executable file;
   trigger and run said application and acquire an assembly in a running state, and, through a proxy mode, run said assembly in said constructed running environment;
   judge that a running assembly triggers a system call;
   redirect said system call, triggered by said running assembly, to said constructed running environment, and execute a corresponding operation according to a preset running configuration; acquire an execution result of said corresponding operation, wherein the corresponding operation comprises an operation of encrypting data, a reset operation triggered for the computing device, and an operation of disabling a certain function of said application; and then process said system call according to said execution result of said corresponding operation when said execution result of the corresponding operation indicates that the corresponding operation has been successfully completed, after the corresponding operation has been executed according to said preset running configuration;
   wherein said preset running configuration is acquired through a control interface set on a processor, said preset running configuration is a configuration distributed by a server, or is a configuration set by a local user.

9. The device for controlling the running of an application according to claim 8, wherein said processor is further configured to: read said application executable file of said application to be monitored; and redirect an application programming interface function in said application executable file to said constructed running environment.

10. The device for controlling the running of an application according to claim 8, wherein said processor is further configured to: acquire the execution result of said corresponding operation generated through executing said corresponding operation; disable or execute said system call according to said execution result of said corresponding operation.

11. The device for controlling the running of an application according to claim 8, wherein said device for controlling the running of an application is a mobile terminal.

12. The device for controlling the running of an application according to claim 11, wherein said mobile terminal is a mobile phone, a personal digital assistant, or an on-board computer.

13. The device for controlling the running of an application according to claim 8, wherein said preset running configuration includes configuration information set with respect to data associated with the running of the application or behaviors of the application, so that said data associated with the running of the application or behaviors of the application are effectively controlled according to the preset running configuration.

14. The device for controlling the running of an application according to claim 8, wherein processor is further configured to execute: when said system call is recorded in configuration information according to the preset running configuration, processing said system call triggered by said application according to said execution result of said corresponding operation herein when said execution result of the corresponding operation indicates that the corresponding operation has been successfully completed.

15. A non-transitory computer readable storage medium, including computer executable instructions, wherein said computer executable instructions are used for executing a method for controlling a running of an application, wherein the method comprises:
    loading an application to be monitored;
    according to a configuration file, analyzing said application and acquiring assemblies of an application executable file;
    triggering and running said application and acquiring an assembly in a running state, and, through a proxy mode, running said assembly in said constructed running environment;
    judging that a running assembly triggers a system call;
    redirecting said system call, triggered by said running assembly, to said constructed running environment, and executing a corresponding operation according to a preset running configuration;
    acquiring an execution result of said corresponding operation, wherein the corresponding operation comprises an operation of encrypting data, a reset operation triggered for the computing device, and an operation of disabling a certain function of said application; and then processing said system call according to said execution result of said corresponding operation when said execution result of the corresponding operation indicates that the corresponding operation has been successfully completed, after the corresponding operation has been executed according to said preset running configuration;
    wherein said preset running configuration is acquired through a control interface set on a processor, said preset running configuration is a configuration distributed by a server, or is a configuration set by a local user.

16. The non-transitory computer readable storage medium according to claim 15, wherein said step of loading an application to be monitored comprises: reading said application executable file of said application to be monitored; and redirecting an application programming interface function in said application executable file to said constructed running environment.

17. The non-transitory computer readable storage medium according to claim 15, wherein said step of acquiring an execution result of said corresponding operation, and then processing said system call according to said execution result of said operation comprises: acquiring the execution result of said corresponding operation generated through executing said corresponding operation; and according to said execution result of said corresponding operation, disabling or executing said system call.

18. The non-transitory computer readable storage medium according to claim 15, wherein said constructed running environment is a security sandbox.

19. The non-transitory computer readable storage medium according to claim 15, wherein said preset running configuration includes configuration information set with respect to data associated with the running of the application or behaviors of the application, so that said data associated with the running of the application or behaviors of the application are effectively controlled according to the preset running configuration.

20. The non-transitory computer readable storage medium according to claim 15, after the step of redirecting said system call, triggered by said running assembly, to said constructed running environment, the method further comprises: when said system call is recorded in configuration information according to the preset running configuration, processing said system call triggered by said application according to said execution result of said corresponding operation herein when said execution result of the corresponding operation indicates that the corresponding operation has been successfully completed.

* * * * *